United States Patent [19]
Racine

[11] 3,738,688
[45] June 12, 1973

[54] QUICK MOUNT FITTING

[75] Inventor: William H. Racine, Lakeside, Mich.

[73] Assignee: Test Tools, Inc., Stevensville, Mich.

[22] Filed: May 10, 1971

[21] Appl. No.: 141,480

[52] U.S. Cl. ............... 285/312, 285/179, 285/323, 285/341, 285/346
[51] Int. Cl. ............................................ F16l 37/18
[58] Field of Search ................. 285/312, 311, 310, 285/309, 105, 104, 348, 343, 323, 341, 346

[56] References Cited
UNITED STATES PATENTS

| | | | |
|---|---|---|---|
| 1,340,785 | 5/1920 | McMullin | 285/312 X |
| 2,461,828 | 2/1949 | Lomelino | 285/343 |
| 3,485,517 | 12/1969 | Howe | 285/348 X |
| 2,017,994 | 10/1935 | Spang | 285/105 |
| 3,185,508 | 5/1965 | Bender | 285/348 X |

FOREIGN PATENTS OR APPLICATIONS

| | | | |
|---|---|---|---|
| 1,382,489 | 11/1964 | France | 285/323 |
| 380,035 | 9/1932 | Great Britain | 285/343 |

Primary Examiner—Thomas F. Callaghan
Attorney—Dominik, Knechtel & Godula

[57] ABSTRACT

A fitting to be quickly mounted to smooth wall tubes, said fitting having an entry for the tube end, an annular seal within said body, and a ram element within said body which is translated to sealing and release positions by a quick operating actuating means. The fitting may be provided as a dead head or may be coupled to a second conduit for conveying fluids therethrough; and the fitting may be adapted for high pressure fluid conveyance by including within the body a split collet member cooperating with said seal to enhance sealing action under high pressure.

2 Claims, 6 Drawing Figures

PATENTED JUN 12 1973
3,738,688
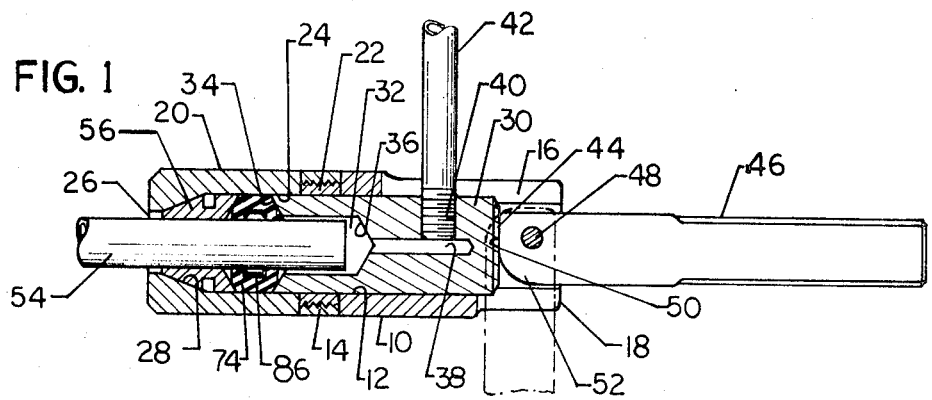
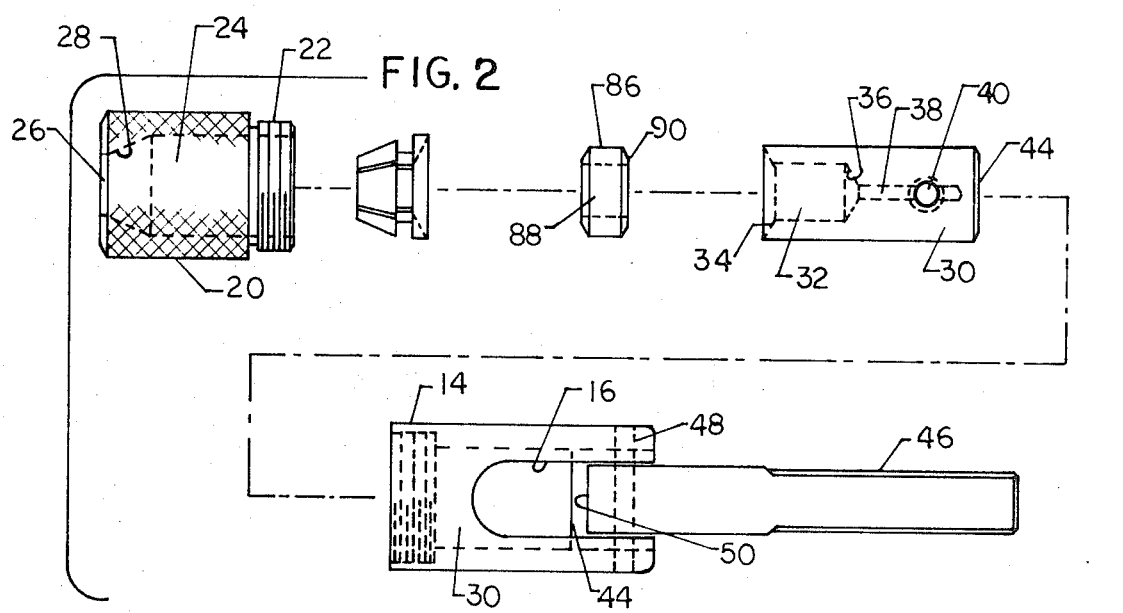
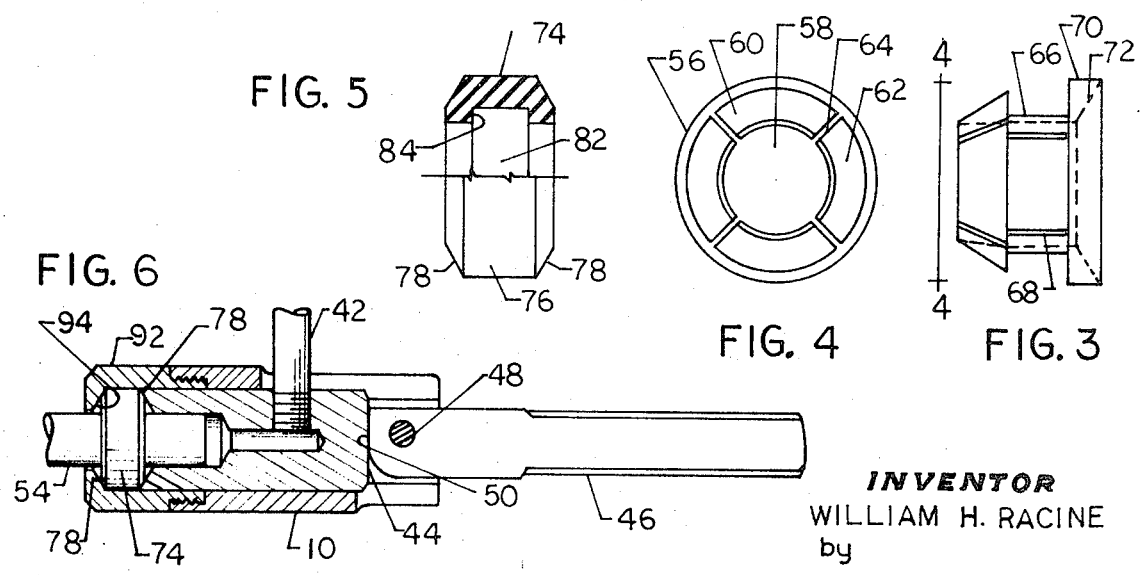
INVENTOR
WILLIAM H. RACINE
by
DOMINIK KNECHTEL & GODULA
ATTORNEYS

QUICK MOUNT FITTING

This invention relates to a fitting which is quickly mounted to a smooth wall tube end to provide efficient sealings and secure mounting for either low pressure or high pressure fluids conveyed through said tube end. The invention particularly relates to a tube fitting of this type wherein quick operating means are provided with said fitting to provide release of the tube end in one position and sealing action in a second position, both positions being quickly assumed.

Various types of fittings for smooth wall tubes have been used for long periods of time in the art. Such fittings in general provide threaded coupling elements housing an annular seal which is distended into sealing action against the tube upon tightening of the threaded coupling element. Such seals are often used in combination with ferrule or collet members to provide biting or clamping action on the thin wall tube. Such fittings have assorted advantages and utilities in this art, but all require secure tightening or turning of the screw coupling element. This understandably requires time both to complete mounting and to provide dismounting when necessary to change fittings, to repair, or the like.

It would be highly desirable in many applications to have a fitting which could be quickly and easily mounted and dismounted. For example, it would be desirable to have such a fitting for low and high pressure charging and vacuum applications on coils, compressors and other components in cooling apparatus. It would additionaly be desirable to have a versatile fitting which can meet such easy on and easy off requirements. In particular, it would be desirable to adapt such a fitting to both low and high pressure fluid conveyance, to provide such a fitting for transmitting fluids to conduits coupled thereto, as well as to provide dead head fittings, as well as still other features.

It is accordingly one important object of the present invention to provide a new fitting which may be quickly mounted in an improved manner by actuating a quick operating means from a first release position to a second seal and lock position.

Still another important object of the present invention is to provide a fitting which can be adapted for both high and low pressure conveying fluids while still obtaining the advantages of quick mounting and dismounting of the fitting.

Still yet another important object of the present invention is to provide an improved fitting of the type described which can be adapted for transmitting fluids therethrough, or which can operate as a dead head fitting. Still yet another important object is to utilize a cam operating element as part of a unitary fitting assembly for quickly torquing to a seal and lock position and quickly torquing to a release position.

Another important object is to provide an improved fitting of the type described which can utilize advantageous complementary tapering surfaces of seals, collets, ferrules, or the like, and other cooperating elements of the fitting to enhance the sealing action in quick mounting of the fitting.

These and still other objects which will occur from time to time to practitioners are now attained by the invention of the following disclosure, including drawings wherein:

FIG. 1 is a partly sectional view of the fitting in side elevation;

FIG. 2 is an elevational exploded view, on an enlarged scale, of components in the improved fitting;

FIG. 3 is a side elevational view, on an enlarged scale, of a split collet component which may be utilized in the improved fitting;

FIG. 4 is a front elevational view of the collet along line 4—4 of FIG. 3;

FIG. 5 is a side elevational view, partly in section and on an enlarged scale, of an elastomeric seal used with the improved fitting; and FIG. 6 is a side elevational view, partly in section, of an embodiment of the fitting useful for mounting to tubes conveying low pressure fluids.

The use of the same numerals in the various views of the drawings will indicate a reference to like structures, elements or other features, as the case may be.

Referring now to the drawings, the body or housing is shown to consist of two coupling parts. One is body part 10 which has body passageway 12 and a threaded end of reduced thickness 14. A coupling slot 16 is in the body part diametrically opposed to a lever slot 18.

A head part 20 is shown with a threaded collar 22, and such head part has a head passageway 24. A threaded lap joint is formed by engagement of threaded elements 14 and 22.

The head part of the body has a reduced opening shown as circular with uniform diameter. An inside tapered area is formed by taper 28 of the wall of the head part.

The assembled head and body parts define a common tubular body passage, and a ram or insert 30 is translatably positionable within this body passage. A ram socket 32 in the ram opens into the body passage, such opening defined by tapered annular edge 34 of the ram. The socket 32 has a conical bottom 36. A reduced fluid passage 38 extends from conical bottom 36 of the socket into the ram element. The threaded bore 14 is shown positioned normally to fluid passage 38, and a coupling conduit 42 is shown mounted in said threaded bore.

The ram element is shown with a force receiving or torquing face or means 44. Quick operating means are positioned to exert a force against face 44, and such means is preferably the illustrated elongated cam element mounted to the body to form a unitary assembly. The cam element has a handle portion 46, and the opposite end is joined to the body by pivot or pin 48. The pin is asymmetrically positioned relative to the long axis of the cam element so that a low cam surface 50 adjoins the force receiving face when the cam element is in release position as shown in solid line in the view of FIG. 1.

The cam element has a high cam surface 52 which induces movement of the ram element towards the body entry 26 when such cam element is moved substantially 90° to the position indicated in phantom in the view of FIG. 1. Movement of the cam element from the first or release position to the second or sealing position is a torquing movement which translates movement of the ram element toward the entry of the body of the fitting.

The end of a smooth walled tube 54 is shown inserted in the fitting. The smooth wall tube passes through a split collet member 56, that is, through collet passage 58 thereof.

The collet is seen to have a truncated cone end 60 consisting of arcuate cone section 62 separated by cone slits 64. A continuous body wall 66 has a plurality of body wall slits 68 which are colinear with the cone slits 64. The other end of the collet has an end flange 70 with an inside circular taper 72. The continuous body wall 66 is of reduced diameter relative to flange 70 and the base of the truncated cone.

The embodiment shown in FIG. 1 shows the smooth wall tube 54 with the mounted collet member 56, and with a mounted annular, elastomeric seal 74. The seal has a continuous wall 76 and substantially spaced opposite tapered edges 78. The continuous wall defines a seal passage 82 which is also shown with a recessed slot 84 in which a split ferrule 86 may be positioned. Such split ferrule is shown to have lapping L ends 88 which allow limited reduction of the diameter of the ferrule. The ferrule also has a biting edge 90.

In operation, the fluid wall tube is passed through entry 26, collet passage 58 and seal passage 82, and the end of the tube is bottomed in ram socket 32 short of conical bottom 36. Quick operation of handle 46 from release to sealing position results in low and high cam surfaces acting against torque receiving face 44 to thereby translate said ram element to urge collet 56 into the tapered area to adjoin the body opening, and to compress and distend seal 74 into sealing action against a substantial portion of the wall of the tube 54. The various tapers are preferably complementary relative to one another to enhance the sealing action, as with tapered cone 60 and inside taper 28; inside taper 72 of end flange 70 and one of tapered edges 78; and tapered edge or face 34 of the ram and the opposite tapered edge of the seal.

The combination of a collet and elastomeric seal, with ferrule, is preferred in a fitting for conveying high pressure fluids. The improved fitting may also be adapted for conveying lower pressure fluids by providing an embodiment such as shown in the view of FIG. 6. Here, a head part 92 is provided with an inside taper 94 which forms a larger internal angle with the wall of tube 54 than does the inside taper 28 of head 20 in the view of FIG. 1. This allows seal 74 to be positioned closer to the open end or entry of the body. Inside taper 94 preferably complements taper 78 of the seal. The additional sealing actions of the collet and ferrule may be dispensed with in many low pressure operations.

The embodiments particularly illustrated herein show the fitting adapted for conveying fluids, high or low pressure, to a conduit coupled to the fitting. A conduit such as 42 can be used as a charging tube, for example, to introduce pressurized air to test for leaks or to charge with a refrigerant such as the Freons. It should be understood that the ram element or insert may be provided without such a coupling conduit, and without threaded bore 40. In such a form, the ram closes off the body passage so that the fitting operates as a dead head fitting, useful for refrigeration coils, compression coils, or still other fluid conveying lines.

While cam means have been illustrated as the preferred form for quickly operating the ram element, it will be appreciated that equivalent means may be used for quickly operating the same element. Such means may comprise a toggle linkage, a bayonet type driving member, a screw driving member and still others. It is only required within the scope of the present invention that the ram element be translatably repositioned by quick operating means, preferably involving only manual execution. It is also preferred that such means be mounted on to the fitting to provide a unitary assembly. No separate, extra tools are therefore required to move said operating means from a first position to a final second position wherein said ram element effects the sealing action against the seal.

The claims of the invention are now presented.

What is claims is:

1. A fitting for outside diameter sealing of a smooth walled tube end, including:

a body, a passage in said body, an entry for such smooth walled tube in said body, an inwardly continuous tapered area at said body entry, an annular elastomeric seal with substantially spaced opposite circumferential tapered edges in the body passage, a split collet element between said annular elastomeric seal and said body entry continuous tapered area, said collet element having a plurality of arcuate cone sections which form a truncated cone at one end, a flange at the other end of the split collet element, and an intermediate continuous body wall of reduced diameter relative to the base of the truncated cone and the flange, said flange further having a taper complementary to the adjacent circumferential tapered edge of the elastomeric seal, said truncated cone, continuous body wall, and flange having a common passageway, the entire length whereof can contact the smooth wall of a tube inserted therein, a ram element in the body passageway positioned to one side of said elastomeric seal for contacting said seal, a passageway in said ram element leading to an open inner end of said ram element, a tapered edge at said inner end of the ram element which is complementary to the adjoining circumferential tapered edge of the elastomeric seal, and a member having a cam surface mounted to said body, said cam member movable to a first release position and to a second sealing position, whereby the cam surface translates said ram into sealing position by moving the ram tapered edge against the adjoining elastomeric seal edge to thereby move the split collet element so the truncated cone engages the body entry tapered area.

2. A fitting which includes the features of claim 1 above, and which further includes a circular slot in the passage formed by said annular elastomeric seal, and a split ferrule element within said slot, said split ferrule element having continuous, spaced biting edges for engaging the smooth wall of the tube.

* * * * *